Jan. 20, 1953  E. M. WHARFF, JR  2,626,344
APPARATUS FOR DIELECTRICALLY HEATING IRREGULARLY
SHAPED OBJECTS UNDER PRESSURE
Filed Feb. 14, 1950  4 Sheets-Sheet 1

WITNESSES:
E. A. McCloskey
Nw. la Groove

INVENTOR
Edward M. Wharff, Jr.
BY
B. L. Tanquill
ATTORNEY

Jan. 20, 1953 E. M. WHARFF, JR 2,626,344
APPARATUS FOR DIELECTRICALLY HEATING IRREGULARLY
SHAPED OBJECTS UNDER PRESSURE
Filed Feb. 14, 1950 4 Sheets-Sheet 2

WITNESSES:

INVENTOR
Edward M. Wharff, Jr.
BY
ATTORNEY

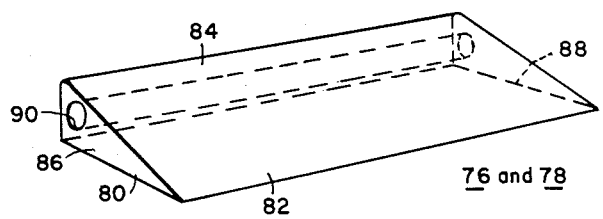
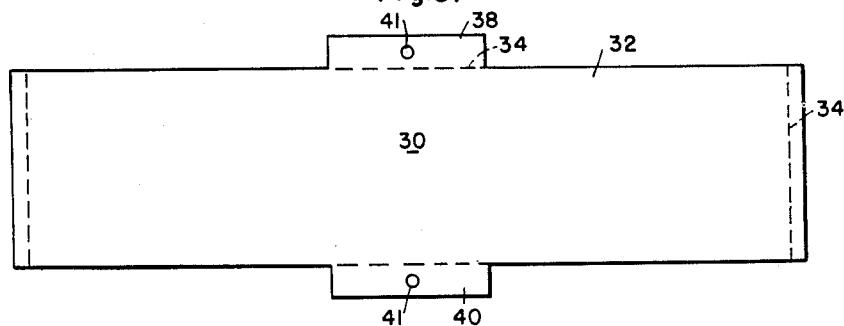
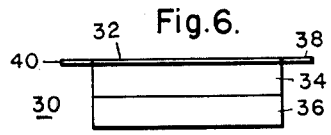
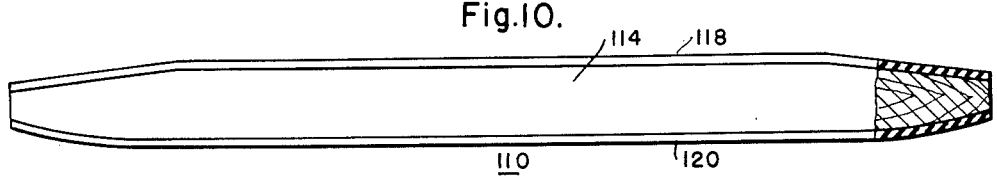
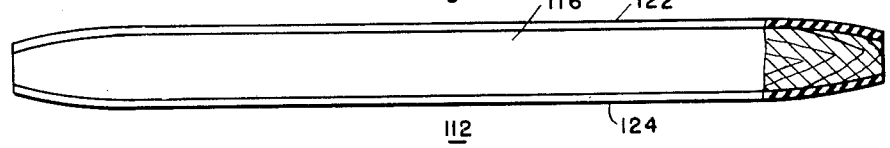

Jan. 20, 1953 E. M. WHARFF, JR 2,626,344
APPARATUS FOR DIELECTRICALLY HEATING IRREGULARLY
SHAPED OBJECTS UNDER PRESSURE
Filed Feb. 14, 1950 4 Sheets-Sheet 4
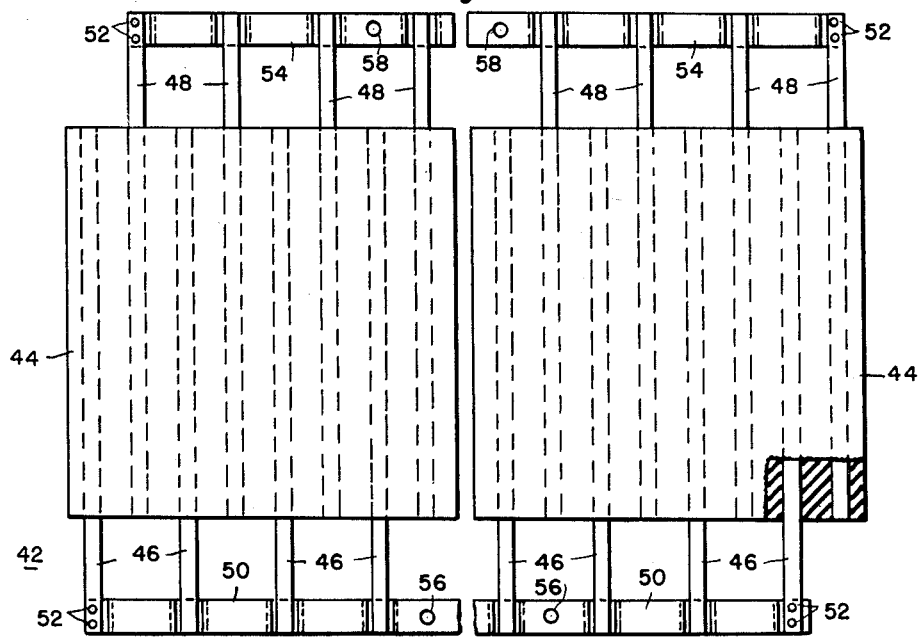
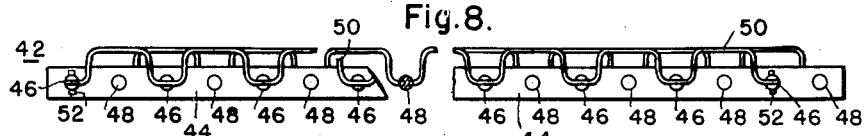
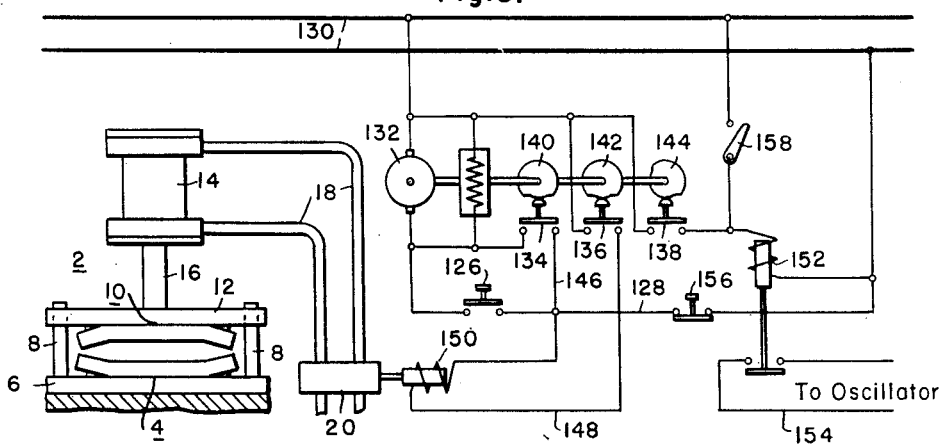
WITNESSES:
INVENTOR
Edward M. Wharff, Jr.
BY
ATTORNEY Patented Jan. 20, 1953

2,626,344

UNITED STATES PATENT OFFICE 2,626,344

APPARATUS FOR DIELECTRICALLY HEATING IRREGULARLY SHAPED OBJECTS UNDER PRESSURE

Edward M. Wharff, Jr., Ellicott City, Md., assignor to Westinghouse Electric Corporation, East Pittsburgh, Pa., a corporation of Pennsylvania Application February 14, 1950, Serial No. 144,054

22 Claims. (Cl. 219—47)

My invention broadly is directed to the dielectric heating of irregularly shaped objects under pressure.

An object of my invention is to provide a dielectric heating press that will press on and dielectrically heat one or more irregularly shaped objects during each heating operation, the pressure on the object or objects being substantially uniform.

Another object of my invention is to provide a dielectric heating press of a type described having platens provided with resilient heating-electrodes which can readily conform to the contour of the objects of each batch of work to be heated, so that the surfaces of the objects of different batches can vary in length and width and in their sloping portions.

A further object of my invention is to provide a dielectric heating press of a type described which can be easily adjusted to heat different sorts of irregularly shaped objects.

An ancillary object of my invention is to provide a dielectric heating press having novel heating-electrodes that can be used repeatedly for a long time without requiring replacement.

Still another object of my invention is to provide a dielectric heating press of a type described having platens with dies that comprise rubber heating-electrode structures; the structures being capable of deforming to the shape of the object pressed between them while applying a substantially uniform pressure to the objects, and of returning to their original forms when the pressure is removed. A feature of this aspect of the invention resides in the construction of the die-structure so as to use a minimum depth of rubber.

A further object of the invention is to provide a platen having heating-electrode die-structure suitable for a dielectric heating press, the die-structure comprising a rubber heating-electrode having metal rods embedded therein and comprising a rubber backing cushion for the heating-electrode. An ancillary object of my invention stemming from this aspect lies in the novel construction of the heating-electrode and its arrangement in the press.

An important feature of my invention resides in a flexible heating-electrode structure for use in dielectric heating means for heating irregularly shaped objects.

The foregoing and other aspects, features and objectives of my invention can be understood by one skilled in the art from the best mode contemplated by me for applying the principles thereof.

This mode of my invention also involves novel improvements for dielectrically cementing or gluing, under pressure, fiber wearing strips to one or more sides of one or more wood shuttle-forms that are subsequently finished into shuttles used in weaving. Weaving shuttles are of various lengths and girths and of various tapers at their ends. Because of the different sizes and tapers of shuttles, and for perhaps other reasons, it has been customary in the past to apply fiber to each wood shuttle-form individually, and numerous hand-operated clamps and wedges were used to hold the fiber to a shuttle-form while the glue between them set. The setting of the glue required several hours, more or less. My invention departs radically from this practice, and provides a press which can economically cement fiber-strips to shuttle-forms in a manner of a few minutes.

In accordance with certain specific features of my invention, the press has opposite platens each of which comprises a base-plate and a die-structure carried thereby. Each die-structure has a heating-electrode at its outer portion comprising a plurality of spaced parallel rods which are alternately connected to the terminals of a high-frequency source of power so as to provide stray field heating. The rods extend transversely of the shuttle-forms. A yieldable cushion is provided in back of the heating-electrode so that the pressure between the platens can be uniformly distributed over the shuttle wood-form or forms being processed between the heating-electrodes.

A very important feature of the invention resides in the provision of means to bend or shape the ends of the heating-electrode die-structure so that it will approximate the shape of the tapered ends of a shuttle-form. This shaping means must be solid enough to transmit the pressure of the press through the bent portions of the rubber of the heating-electrode die-structure. It is also desirable to be able to adjust the points at which the portions of the die-structure begin to bend so that the press can be used to process shuttle-forms of different sizes and shapes. In the preferred mode of my invention, this shaping means is incorporated into a platen and is in the form of one or more wedging means comprising a solid wedge member that is adjustably carried by the base-plate of the platen.

Objects, features, aspects and innovations of my invention, in addition to the foregoing, will be discernible from the following description of the preferred mode thereof. This description is to be taken in conjunction with the accompanying drawings which are on different scales and are limited to such parts and details as are adequate for understanding the invention. In the drawings:

Fig. 4 is a perspective view of a wedge member for the die-shaping means;

Fig. 5 is a broadside view of a backing cushion of the heating-electrode die-structure, with the cushion flat;

Fig. 6 is an end view of the backing cushion of Fig. 5;

Fig. 7 is a broadside view of a heating-electrode in accordance with my invention, with the heating-electrode flat;

Fig. 8 is an elevational view of the heating-electrode of Fig. 7;

Fig. 9 is a schematic diagram of a control system for explaining the application of my invention to the processing of weaving shuttles; and Figs. 10 and 11 are views, with parts in section, of two different shuttles that can be processed in a press embodying my invention;

Figure 1:
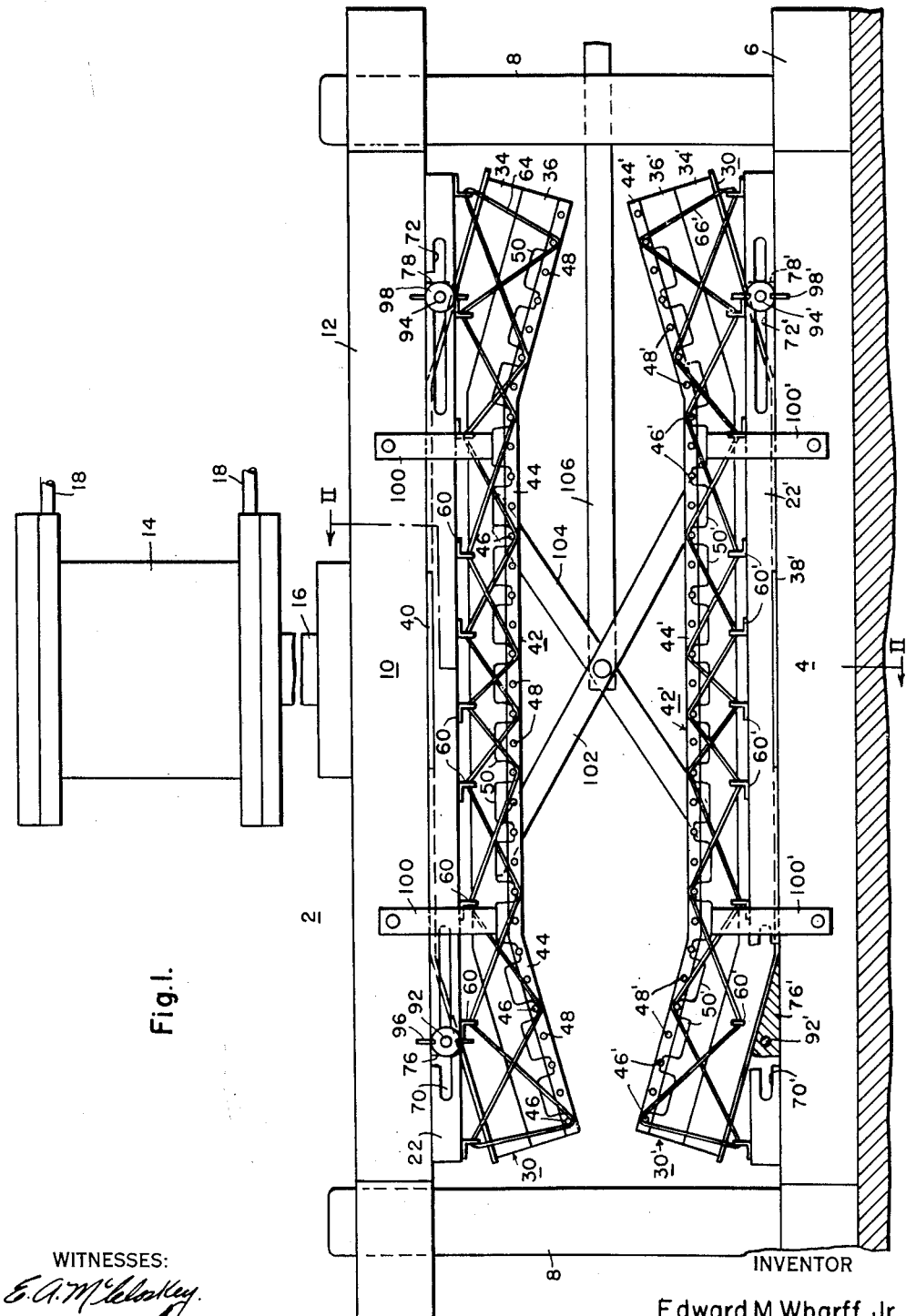
Figure 1 is an elevational view, with parts broken away, of a part of a dielectric heating press embodying features of my invention.

As shown in Figs. 1 and 9, a press is represented in its entirety by the reference numeral 2 and comprises a solid stationary lower support which includes a lower platen 4 comprising a lower base-plate 6. A plurality of guide rods 8 extends perpendicularly upwardly from the base-plate. The press also comprises a movable upper platen 10 having an upper base-plate 12 that has a plurality of holes that fit the guide rods 8 for the upper platen 10. Preferably the base-plates 6 and 12 are single rigid plates, but the term baseplate is intended to embrace any equivalent structure. The press also comprises any suitable power drive for pressing the platens toward each other and for separating them, this drive being shown herein as comprising a hydraulic cylinder 14 and an operable piston rod 16 connected to the top of the upper platen 10. The cylinder 14 has a pipe means 18 controlled by a valve means 20. In one position of the valve means 20 a hydraulic force is applied to the piston rod 16 to press the platen 10 downwardly toward the platen 4 and in another position of the valve means 20 the platen 10 is raised, in any suitable manner well known to the art.

*The upper platen 10*

With more particular reference to Figs. 1 through 8, the base-plate 12 of the upper platen 10 has substantially straight longitudinal edges to which a pair of narrow elongated bars 22 and 24 are removably secured by screws 26. The space between the bars 24 and 26 provides a pocket or seat therebetween for receiving the heating-electrode die-structure associated with the upper platen 10. The heating-electrode die-structure comprises an inner resilient cushion 30 shown in Figs. 5 and 6. This cushion 30 comprises a thin flexible brass-sheet backing member 32 and two much thicker rectangular sheets or mats 34 and 36 of die rubber. The metallic backing member 32 and the die-rubber mats 34 and 36 are cemented together at their abutting broad surfaces. The backing member 32 has a pair of positioning lugs 38 and 40 protruding centrally at its longitudinal edges.

The cushion 30 sits in the seat between the bars 22 and 24 of the platen. The central portion of the backing member 32 of the cushion 30 fits flush against the base-plate 12 and its lugs 38 and 40 are received in similarly shaped notches in the bars 22 and 24, respectively, which help to hold the cushion in place. In furtherance of this end, the lugs 38 and 40 have holes 41 through which certain of the screws 26 can pass when the bars 22 and 24 and the base-plate 12 are secured together with the lugs 38 and 40 therebetween.

The upper heating-electrode die-structure also comprises an outer heating-electrode 42 which is held against the under surface of the cushion 30. This heating-electrode is more particularly shown in Figs. 7 and 8, and comprises a compressible resilient electrode-holder 44 in the form of a rubber sheet or mat having a plurality of equally spaced transversely-extending holes therethrough in which a plurality of parallel bar-type electrodes 46 and 48 snugly fit, the electrodes 46 and 48 alternating. The electrodes are in the nature of solid rods, circular in cross section, and adjacent electrodes are connected to opposite sides of a source of high frequency power in order to provide stray field dielectric heating. For accomplishing this purpose conveniently, the ends of the electrodes 46 protrude beyond the electrodes 48 on a single side of the electrode-holder 44, whereas on the opposite side of the electrode-holder 44 the ends of the electrodes 48 protrude beyond the electrodes 46, as shown in Fig. 7. The other, or non-protruding, ends of the two series of rod-electrodes 46 and 48 are preferably substantially flush with the associated sides of the rubber electrode-holder 44.

The series of rod-electrodes 46 are electrically interconnected by any suitable means having high conductivity and flexibility so that it can follow the repeated deformation of the heating-electrodes in the press. In accordance with a preferred mode of my invention, this connector means comprises a sinuous metal jumper-connector 50. This connector 50 has a substantially rectangular wave-form with rounded corners so as to provide horizontal portions that fit into slots in the extreme tips of the protruding ends of the rod-electrodes 46. For positioning and securing the connector 50 in the slots, the ends or flat-parts of the connector are placed into the slots of the associated rod-electrodes 46. Through-holes may then be drilled through the connector 50 and certain of the rod-electrodes 46, shown as the end rod-electrodes 46. These holes receive rivets 52 that are then upset. All slots can then be filled with a soft solder. If desired, spacer tubes of insulating material can be placed around the protruding ends of the rod-electrodes 46 in a position between the rubber electrode-holder 44 and the connector 50.

On the opposite side of the electrode-holder 44, the rod-electrodes 48 are electrically tied together by a metal connector 54 in the same way as the rod-electrodes 46 are electrically tied together by the connector 50.

It is to be noted that the connectors 50 and 54 of the upper platen extend from the rod-electrodes 46 and 48 in a direction away from the lower platen; and that a pair of spaced holes 56 are provided in the connector 50 and a pair of spaced holes 58 are provided in the connector 54.

These holes 56 and 58 are used for securing energizing jumpers to the connectors 50 and 54 as will later be apparent.

As an illustration of a practicable embodiment of my invention, in a press for cementing fiber to wood shuttle-forms, each of the rubber cushion-mats, equivalent to the mats 34 and 36, was of die rubber 6 inches wide, 25 inches long and 1 inch thick, and had a durometer hardness of 45–50. The electrode-holder equivalent to the holder 44 was pure gum rubber ½-inch thick and substantially the same length and width as the mats. The gum rubber had a power factor of .011 and a loss factor of .03 or less. The rod-electrodes were stainless steel ¼ inch in diameter and the connectors were flexible tough copper-beryllium strip. In some tests, and additional thickness of gum-rubber about $\tfrac{1}{12}''$ was applied to the outer surfaces of the heating-electrodes. Some improvement in the life of the heating-electrodes was noted, especially with respect to their being cut by the sharp edges of fiber of a shuttle-form, but this expedient has the disadvantage of requiring a higher energizing voltage. If desired heavy nylon fabric may be molded into the sides of the electrode-holder. I have not yet found a satisfactory way for cementing the gum-rubber electrode-holder to the die-rubber cushion-mats in a way that would last for practical lengths of time for the specific use herein disclosed; and my invention extends to a novel yieldable means for yieldably holding the heating-electrode 42 against the face of the cushion 30, this means also helping to hold the heating-electrode die-structure onto the base-plate 12.

Figure 3:
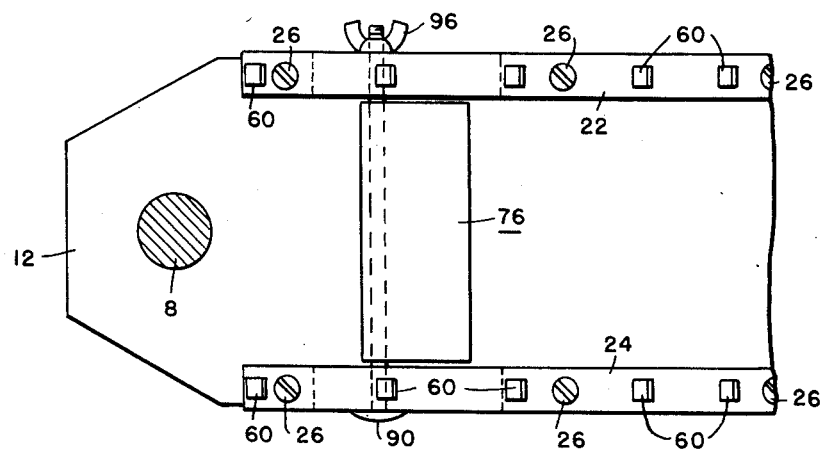
Fig. 3 is a broadside view of part of a platen, having the heating-electrode die-structure removed but showing the shaping or wedging means.

For yieldably holding the heating-electrode 42 in position, the bars 22 and 24 have secured thereto a plurality of small angle bars 60 spaced therealong. The angle bars 60 are more closely spaced at the center of the bars 22 and 24, than the angle bars 60 toward the ends of the bars 22 and 24, as shown in Figs. 1 and 3. The angle bars 60 have the broad sides of their upright legs facing in the length-direction of the bars 22 and 24. Each of these upright legs has a central hole 62 that is rounded or provided with a grommet. A lacing 64 passes through the holes 62 and around the protruding ends of certain of the rod-electrodes 46 at one side of the platen, and a lacing 66 is similarly arranged at the other side of the platen passing around ends of rod-electrodes 48. To facilitate assembly while lacing is done, the heating-electrode 42 can be temporarily cemented to the cushion 30. I have found untreated fiber glass cordage satisfactory, since it slides readily in the holes 62 and on the protruding ends of the rod-electrodes when the die-structure is deformed as will later be described. In the event that too much friction is encountered by the lacings sliding on the rod-electrodes, loose-fitting insulating spacer tubes can be provided on the protruding ends of the rod-electrodes.

With the foregoing structure, it is evident that the die-structure comprising the cushion 30 and heating-electrode 42 is yieldably held to the base-plate 12 by a yieldable means comprising the bars 22 and 24, the angle 60 and the lacings 64 and 66.

In accordance with my invention, the die-structure is initially shaped to the general contour of the object to be dielectrically heated. To this end, I provide a shaping means which, in the preferred mode of my invention for treating shuttle-forms, comprises a tapered member or wedge at each end of the platen 10, between the bars 22 and 24, as shown in Fig. 1. The bar 22 has an elongated slot 70 at one end and an elongated slot 72 at the other end; and the bar 24 has similar slots which are aligned in a transverse direction with those in the bar 22. A tapered member 76 of a shape shown in Fig. 4 is placed in the space between the pair of aligned slots 70, and a similar member 78 is placed between the pair of aligned slots 72. Consequently, two such tapered members 76 and 78 are provided for the upper platen, the former being associated with the slots 70 and the latter with the slots 72. Each tapered member comprises a pair of tapered faces 80 and 82, an upstanding side 84, and a pair of triangular ends 86 and 88. It is to be noted that each tapered member tapers in a direction perpendicular to the length-direction of the rod-electrodes 46 and 48 of the heating-electrode 42; and that the upstanding sides 84 face outwardly with respect to the center of the platen 10.

Each wedge member 76 and 78 also has a through-hole 90 opening into the triangular ends 86 and 88. A bolt 92 passes through the hole 90 of the member 76 and the aligned slots 70; and a bolt 94 passes through the hole 90 of the member 78 and the aligned slots 72. Wing nuts 96 and 98 on the bolts 92 and 94, respectively, hold the tapered members in any adjusted position within the lengths of the slots 70 and 72. Different bars such as 22 and 24 can be kept at hand interchangeable with those on the platen 10 so as to provide a still greater degree of adjustment lengthwise of the platen.

Each tapered member 76 or 78 causes the heating-electrode die-structure to bend along a bend-line which is parallel to the rod-electrodes 46 and 48. When a tapered member 76 or 78 is adjusted on the base plate 12, one of its tapered faces slides along the bottom of the adjacent surface of the base-plate 12 and its other tapered face slides along the cushion 30, moving the bend-line. By providing a metal sheet backing 32 for the die-structure, the friction between the tapered member and die-structure is materially reduced.

*The lower platen 4*

In the preferred embodiment of my invention, the lower platen 4 is constructed in the same manner as the upper platen 10, duplicating the parts of the latter. Consequently, except for the base-plates 6 and 12, the parts of the lower platen 4 have been given the same reference numerals as those applied to the corresponding parts of the upper platen 10, but with that the reference numerals for the lower platen primed. Accordingly, the lower platen comprises bars 22' and 24', a die-structure including a backing cushion 30' and a heating electrode 42', and die-shaping means comprising tapered members 76', 78' adjustably positioned by bolts and wing nuts 96' and 98'.

The bars 22' and 24' have angle bars 60' with holes 62', and have slots 70' and 72'. The backing cushion 30' comprising a sheet metal plate 32' having lugs 38' and 40', and die-rubber mats or sheets 34' and 36'. The heating-electrode 42' comprises a gum rubber sheet or mat 44' in which rod-electrodes 46' and 48' are placed. The protruding ends of the electrodes 46' at one side of the platen are electrically conductively connected together by a connector 50'; and the protruding ends of the rod-electrodes 46' on the other side of the platen are connected together by the connector 54'. Lacings 64' and 66' help yieldably to hold the lower-platen die-structure to the base-plate 6.

Energizing connections

In the arrangement of my preferred embodiment, rod-electrodes of the same potential on the heating-electrodes 42 and 42' are directly opposite to each other. For applying high frequency energy to the rod-electrodes, the connectors 50 and 50' are directly grounded by bowed jumpers 100 and 100', respectively. Each jumper is securely connected to a connector by any suitable means such as a bolt and nut means associated with a hole, such as 56 in the connector 50. Each jumper extends to the associated metal base-plate 6 or 12, as the case may be, to which it is also securely attached by bolts or other suitable means. Accordingly, the rod-electrodes 46 and 46' will be at ground potential, it being understood that the base-plates 6 and 12 will either be solidly connected to ground or to a grounded or equivalent conductor of a high frequency source of supply. The bowing of the jumpers 100 and 100' allows them to conform to the deformation of the associated die-structures.

Figure 2:
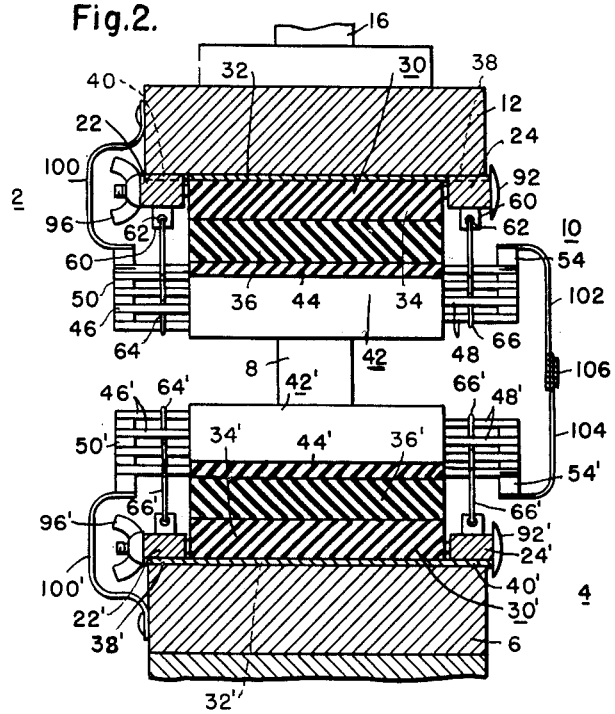
Fig. 2 is a cross-sectional view substantially on the lines II—II of Fig. 1, but with the rod-electrodes spaced for clarity of illustration.

The other rod-electrodes 48 and 48' are connected to the other side of the high frequency source through crossed jumpers 102 and 104. The jumper 102 is solidly secured to the connectors 56 and 56' by any suitable means including, for example, bolts extending through a hole such as the hole 58 in the connector 54. Similarly, the jumper 104 is also connected to the connectors 54 and 54'. An insulated conductor 106 of a high frequency source of supply is attached to the crossing points of the jumpers 102 and 104, all three of these parts being intimately tied together for solid electrical connections. As shown in Fig. 2, the jumpers 102 and 104 are bowed so as to allow movement of the platens toward and away from each other without interfering with the conductive connections, and to conform to the deformations of the die-structures.

Operation

The preferred form of my invention thus far described is designed particularly to treat different forms of shuttles. Those shown to scale in Figs. 10 and 11 are illustrative of the great many different kinds found in practice. The shuttle-forms 110 and 112 of Figs. 10 and 11 differ in lengths and differ in cross-sectional dimensions, the cross-section usually being rectangular or square. The ends also taper differently.

The shuttle forms 110 and 112 have wood cores 114 and 116, respectively. A thin strip of fiber 118 is to be glued to one side of the core 114, and a thin strip of fiber 120 to the opposite side. Similarly, a thin strip of fiber 122 and a thin strip of fiber 124 are to be glued to opposite sides of the core 116.

Assume that a plurality of shuttle-forms of the same kind are to be processed, each having tapers at each end of a pair of opposite sides. The wedges 76, 78, 76' and 78' are adjustably positioned along their associated base-plates 6 and 12. It is, of course, to be understood that the exact positions of the different wedges need not be the same, and will depend on the taper at the end of the particular side of the wood shuttle-form with which that particular wedge is associated.

The platens 4 and 10 are then pressed together and high frequency applied to the heating-electrodes for a desired length of time. By trial and error, a suitable adjustment of the wedges and of heating time can be found which will give a solid joint between the fiber strips and the wood shuttle-cores for the full lengths of the cores. Once an adjustment is found for a particular shuttle-form, it can be recorded and duplicated whenever the same kind of shuttle-form is to be again processed.

Fig. 9 illustrates a control means for the press. Assuming that the start button 126 is momentarily closed, a circuit 128 is completed from the power conductors 130 through the cycle- or timer-motor 132 which may be of any conventional type operable through a cycle. The timer-motor 132 drives any suitable multiple circuit-controller represented in Fig. 9 by a plurality of normally biased open contacts 134, 136 and 138 and adjustable cam-operators 140, 142 and 144 therefor. Upon starting of the timer-motor 132, the cam 140 immediately closes contacts 134 to close a motor-holding circuit 146. As the motor rotates farther, cam 142 closes contacts 136 to energize a circuit 148 that energizes a valve-operating solenoid 150. Operation of the solenoid 150 causes the valve 20 to move to a position in which liquid under pressure is applied to the upper end of the cylinder 14. As a result, the platen 10 is forced downwardly on its guide rods 8, and presses upon the shuttle-forms resting on the platen 4. Subsequently, the time-operated cam 144 of the timer closes contacts 138 to energize a circuit which includes a relay 152. Energization of relay 152 completes a circuit 154 that causes high frequency to be applied across the jumpers 100 and 100', on the one hand, and the jumpers 102 and 104, on the other. A plurality of stray high-frequency electric fields are thereby established between the various pairs of adjacent rod-electrodes on each heating-electrode 42 and 42'. These fields heat the glue line between the fiber strips 118 and 120 and the core 114 of the shuttle-forms 110 in the press.

The high-frequency energy is supplied until the cam 144 opens the contacts 138. Thereafter, the cam 142 opens contacts 136 for deenergizing the solenoid 150. Deenergization of the solenoid 150 operates the valve 20 to release the force acting in the upper part of the cylinder 14, and may apply a force to its lower part for raising the platen 10 on its guide rods 8. Thereafter, the cam 140 releases its contacts 134, opening the holding circuit 146 and deenergizing the timer-motor 132 until the next operation of the start button 126. Accordingly, the press is now ready to be reloaded with additional shuttle-forms to be processed. Switches 156 and 158 and additional switches may be provided for superimposing manual control on the automatic cycle-timer if desired. Such manual control is convenient for initial adjustment of the apparatus.

I have found that very flexible rod-electrodes were not mechanically satisfactory because of their continual bending around the edges of the shuttles when the platens were repeatedly pressed together. This bending caused fatigue and breaking of individual rods, regardless of whether the rod-electrodes extended parallel to the length-direction of the shuttles or transverse to them. I have found, however, that strong rods running transverse or across the shuttles, capable of withstanding the pressing forces without bending, avoid this trouble and are quite satisfactory as electrodes. These rods should be heavy enough so that they will not bend over the edge of the shuttles when pressure is applied, and should be spaced enough to permit the associated die-structure to conform to the taper of the shuttle. So long as the rods are sufficiently strong, they may be solid, or hollow. The latter are preferred in instances where it is desired to cool the heating-electrodes by passing cooling water through the rods. The rods may also be oval-shaped preferably with their longer axes parallel to the electrode-holders 44 and 44'.

In the specific application of the invention briefly discussed hereinbefore, a thermal setting ureaformaldehyde resin adhesive was used for bonding standard shuttle fiber to either dogwood or persimmon shuttle-cores. Stainless steel rods of ¼ inch diameter spaced ¾ inches between centers in a gum-rubber heating-electrode which was 24 inches long were quite capable of repeatedly applying a substantially uniform pressure of about 200 pounds per square inch to many different kinds of shuttle-forms, including those of a type shown to scale in Fig. 10 having a length of 15½ inches, a height of 1¼ inches with fiber strips of about $\frac{3}{32}$ inch, and a width of 1$\frac{7}{16}$ inches. The wedges 76, 78, 76' and 78', in adjusted position, were spaced apart a distance between centers which is approximately 1 inch longer than the shuttle-forms being glued. In loading the press, the shuttle-cores and fibers were placed centrally between the wedges as close as hand operation and judgment of the operator could determine without other guides. In each heating operation the pressure on the shuttle-forms continued until the whole glue line reached the curing temperature of the adhesive used. With stray field heating, such as herein-described, and at a frequency of 13.6 megacycles per second, the electric field in the glue line is usually strongest in the area midway between adjacent rod-electrodes. The adhesive in this area sets or cures first so that it is necessary to maintain the pressure until the whole glue line is satisfactorily heated. Under the foregoing conditions, a single operator was capable of gluing 60 shuttles per hour, the machine pressing on two shuttles at a time.

While I have described my invention with reference to the best mode now preferred, and have cited details of a specific application, it is quite clear that the broader aspects of my invention are not necessarily limited to this mode or to these details.

I claim as my invention:

1. A dielectric heating press suitable for heating objects of irregular shape such as wood shuttle-forms, comprising in combination, a pair of platens, pressure-applying means connected to said platens for pressing said platens toward each other and for separating said platens, a first of said platens comprising a base-plate, a flexible heating-electrode having a natural undeformed shape, fastener means attaching said flexible heating-electrode to said first platen, and shaping means deforming said flexible heating-electrode out of its said natural shape, said shaping means comprising a rigid member positioned between said base-plate and said flexible heating-electrode and adapted to transmit a pressing force on said platen to said flexible heating-electrode.

2. A dielectric heating press as defined in claim 1 but characterized further by said heating-electrode comprising a rubber sheet having a series of parallel spaced holes, and metal rods in said holes, said metal rods being stiff for transmitting the force on said heating-electrode to an object between the platens without bending of the rods.

3. A dielectric heating press suitable for heating objects of irregular shapes and of various sizes, such as wood shuttle-forms, comprising in combination, a pair of platens, pressure-applying means connected to said platens for pressing said platens toward each other and for separating said platens, each of said platens comprising a base-plate and an adjustable heating-electrode die-structure, each of said die-structures comprising a heating-electrode having portions which are adjustable to a plurality of selectable angles relative to its respective base plate.

4. A dielectric heating press suitable for heating objects of irregular shape such as wood shuttle-forms, comprising in combination, a pair of platens, pressure providing means connected to said platens for pressing said platens toward each other and for separating said platens, each of said platens, comprising a base-plate and a heating-electrode die-structure, each of said die-structures comprising a heating-electrode having a bent-portion, said bent portion starting at a bend-line which extends in a predetermined direction along the last said heating-electrode, with the last said heating-electrode comprising a plurality of spaced elongated metal rod-electrodes extending lengthwise in a direction substantially parallel to said predetermined direction.

5. A dielectric heating press suitable for heating objects of irregular shape such as wood shuttle-forms, comprising in combination, a pair of platens, means for pressing said platens toward each other and for separating said platens, each of said platens comprising a base-plate and a heating-electrode die-structure, said die-structures comprising a heating-electrode having a bent-portion, the bent-portion of said heating-electrode starting at a bend-line extending in a predetermined direction along the last said heating-electrode, the last said heating-electrode comprising a plurality of spaced elongated metal rod-electrodes extending lengthwise in a direction substantially parallel to said predetermined direction, the last said heating-electrode comprising a rubber sheet in which said rod-electrodes are imbedded, said die-structures further comprising a backing cushion between the last said heating-electrode and its associated base-plate, said cushion comprising a die-rubber mat, and means comprising a lacing holding the last said heating-electrode against said cushion.

6. A dielectric heating press suitable for heating objects of irregular shape such as wood shuttle-forms, comprising in combination, a pair of platens; pressure providing means for pressing said platens toward each other and for separating said platens; each of said platens comprising a base-plate, a die-structure, and holding means attaching said die-structure to the inner side of said base-plate; each die-structure comprising an outer flexible heating-electrode and a backing cushion made of rubber; a first of said platens comprising a shaping-means associated with the base-plate thereof, said shaping means comprising a rigid member in contact with a fraction only of the associated die-structure along said inner side of said base-plate.

7. A dielectric heating press as defined in claim 6 but further characterized by said rigid member being tapered, and by said shaping means comprising means for securing said tapered member and the associated base-plate together in adjustable positions with respect to the last said base-plate, and by said die-structure comprising a metallic backing sheet along which said tapered member is adapted to slide.

8. A dielectric heating press as defined in claim 6 but further characterized by said rigid member being tapered and by said shaping means comprising means for securing said tapered member and the associated base-plate together in adjustable positions with respect to the last said base-plate.

9. A dielectric heating press as defined in claim 8 but further characterized by said holding means comprising a lacing holding the last said heating-electrode against said cushion.

10. A dielectric heating press suitable for heating objects of irregular shape such as wood shuttle-forms, comprising in combination a pair of platens, pressure providing means for pressing said platens toward each other and for separating said platens, each of said platens comprising a die-structure and a base plate, each die-structure comprising a heating-electrode and a backing cushion which is positioned between the associated heating-electrode and base-plate, each heating-electrode comprising a rubber sheet and a plurality of spaced and substantially stiff rods carried thereby, a plurality of fasteners carried by each base-plate, and a yieldable means for each base-plate cooperating with the associated fasteners and heating-electrode for holding the associated die-structure against its associated base-plate, with shaping means associated with each platen and comprising a rigid member adjustably positionable along the associated base-plate and deforming the associated die-structure.

11. A dielectric heating press as defined in claim 10 but further characterized by each of said cushions comprising a die-rubber mat and a flexible metallic sheet adjacent the associated base-plate and by the associated rigid member being slidable along the faces of the associated base-plate and flexible metallic sheet.

12. A dielectric heating press suitable for heating objects of irregular shape such as wood shuttle-forms, comprising in combination a pair of platens; means for pressing said platens toward each other and for separating said platens; each of said platens comprising a die-structure; each die-structure comprising a heating-electrode and a backing cushion between the associated heating-electrode and base-plate; each heating-electrode comprising a rubber sheet and a plurality of spaced stiff rods carried thereby; each cushion comprising a die-rubber mat adjacent the associated heating-electrode and a flexible metallic sheet adjacent the associated base-plate; means securing the center of each of said sheets to the associated base-plate; shaping means comprising a rigid member along an end of each of said die-structures shaping the associated die-structure; and yieldable means yieldably holding each die-structure on the associated base-plate.

13. A dielectric heating press as defined in claim 12 but further characterized by adjustment means for adjusting the position of said rigid members.

14. A dielectric heating press as defined in claim 12 but further characterized by said rods for each of said heating-electrode being parallel, and said rigid members being elongated and substantially parallel to the associated rods.

15. A dielectric heating press suitable for heating objects of irregular shape such as wood shuttle-forms, comprising in combination a pair of platens, pressure providing means connected to said platens for pressing said platens toward each other and for separating said platens, each of said platens comprising a die-structure and a base-plate, each die-structure comprising a heating-electrode and a backing cushion positioned between the associated heating-electrode and base-plate of each platen, each heating-electrode comprising a rubber sheet and a plurality of spaced stiff rods carried thereby, each backing cushion comprising a die-rubber mat adjacent the associated heating-electrode, the alternate rods of each heating-electrode having ends protruding farther out from a side thereof than the remaining rods, and said remaining rods having ends protruding farther on the other side of the associated heating-electrode, a first connector means conductively connecting the protruding ends of said rods of said heating-electrodes which are at one side of said press, and a second connector means conductively connecting the protruding ends of said rods of the last said heating-electrodes which are at the other side of said press, with lacing means yieldably holding a first of said die-structures to the associated base-plate, said lacing means comprising a lacing passing around a plurality of said ends.

16. A platen suitable for dielectric heating, comprising in combination, a base-plate, a heating-electrode die-structure comprising a deformable rubber mat, fastener means holding said die-structure to said base-plate, and shaping means comprising a rigid member interposed between the end portions of said mat and the base-plate and deforming said mat.

17. A platen suitable for dielectric heating of an irregularly shaped workpiece comprising in combination, a base-plate, a die-structure comprising an outer heating-electrode comprising a plurality of stiff and substantially parallel rod-electrodes and a flexible rubber sheet holding said rod-electrodes, said die-structure comprising a cushioning means interposed between said rod-electrodes and said base-plate, and a rigid member interposed between said cushioning means and base-plate, said rigid member being positioned along the length of said cushioning means at a position corresponding to an irregularly shaped area of said workpiece, said rigid member being substantially parallel to said rod-electrodes.

18. A platen as defined in claim 17 but further characterized by yieldable means holding said die-structure on said base-plate, and positioning means being provided for securing said rigid member in different positions along said cushioning means with respect to said base-plate.

19. A platen suitable for dielectric heating of an irregularly shaped workpiece, comprising in combination, a base-plate, a shaping member, positioning means for adjustably securing said shaping member on said base-plate, a die-structure comprising deformable material and a heating-electrode carried thereby, and fastener means attaching said die-structure to said base-plate with said material against said shaping member.

20. A platen suitable for dielectric heating comprising in combination, a base-plate, a tapered member, means adjustably securing said tapered member on said base-plate, a die-structure comprising a cushion and a heating-electrode comprising rubber containing a plurality of spaced and stiff substantially parallel elongated rod-electrodes, and fastener means attaching said die-structure to said base-plate with said cushion against said tapered member and said rod-electrodes extending lengthwise and substantially perpendicular to the direction of taper of said tapered member.

21. A platen suitable for dielectric heating comprising in combination, a base-plate, a tapered member at each end of said base-plate, each of said tapered members tapering in a first direction toward the other, a die-structure comprising a cushion and a heating-electrode comprising a plurality of stiff substantially parallel elongated rod-electrodes spaced along the length of said die-structure, said rod-electrodes extending lengthwise in a second direction substantially perpendicular to said first direction, and means attaching said die-structure to said base-plate with portions thereof against said tapered members.

22. A platen as defined in claim 21 but characterized further by said heating-electrode comprising gum rubber and said cushion comprising die-rubber thicker than said gum rubber.

EDWARD M. WHARFF, Jr.

REFERENCES CITED

The following references are of record in the file of this patent:

UNITED STATES PATENTS

| Number | Name | Date |
|---|---|---|
| 2,018,736 | Norris | Oct. 29, 1935 |
| 2,179,261 | Keller | Nov. 7, 1939 |
| 2,342,846 | Crandell | Feb. 29, 1944 |
| 2,435,866 | Bilhuber | Feb. 10, 1948 |
| 2,441,699 | Gramelspacher | May 18, 1948 |
| 2,492,413 | Brophy | Dec. 27, 1949 |

FOREIGN PATENTS

| Number | Country | Date |
|---|---|---|
| 342,419 | Great Britain | Feb. 5, 1931 |
| 549,896 | Great Britain | Dec. 11, 1942 |
| 600,669 | Great Britain | Apr. 15, 1948 |